United States Patent [19]

Faucher et al.

[11] Patent Number: 4,938,059
[45] Date of Patent: Jul. 3, 1990

[54] MONOPIECE STRAIN GAUGE STING MOUNTED WIND TUNNEL BALANCE

[75] Inventors: Gilles Faucher, Sillery; Marc-André Paradis, Ste-Foy; Bertrand Girard, Sillery, all of Canada

[73] Assignee: Her Majesty the Queen in right of Canada, as represented by the Minister of National Defence, Ottawa, Canada

[21] Appl. No.: 416,404

[22] Filed: Oct. 3, 1989

[30] Foreign Application Priority Data

Oct. 14, 1988 [CA] Canada .................................. 580277

[51] Int. Cl.⁵ ............................................. G01M 9/00
[52] U.S. Cl. ........................................................ 73/147
[58] Field of Search ........................................... 73/147

[56] References Cited

U.S. PATENT DOCUMENTS

| | | | |
|---|---|---|---|
| 2,785,569 | 3/1957 | Miller | 73/147 |
| 2,885,890 | 5/1959 | Liccini et al. | 73/147 |
| 3,019,643 | 2/1962 | Curry | 73/147 |
| 3,159,027 | 12/1964 | Curry | 73/147 |
| 3,412,604 | 11/1968 | Iandolo | 73/147 |
| 4,074,567 | 2/1978 | Horanoff | 73/147 |
| 4,688,421 | 8/1987 | Pzsolla | 73/147 |

*Primary Examiner*—Donald O. Woodiel
*Attorney, Agent, or Firm*—William R. Hinds

[57] ABSTRACT

A strain gauge balance consisting of an outer longitudinal shell and a monopiece inner center core; the outer shell having a open end and a closed end with a frusto-conical bore extending towards the closed end, and the inner core having frusto conical shaped ends, one end being sized to fit within the frusto conical core and the other end being sized to fit into a sting; four radially extending, equally spaced, webs formed within the core and at each end of the core inboard of the frusto conical ends, and a central region of two longitudinally separated, semicircular cross-section parts each being formed within the part, with tensioning rings, one disposed diagonally to the other, and a number of strain gauges secured to the webs and the rings to determine induced strain in 6 degrees of freedom.

8 Claims, 3 Drawing Sheets

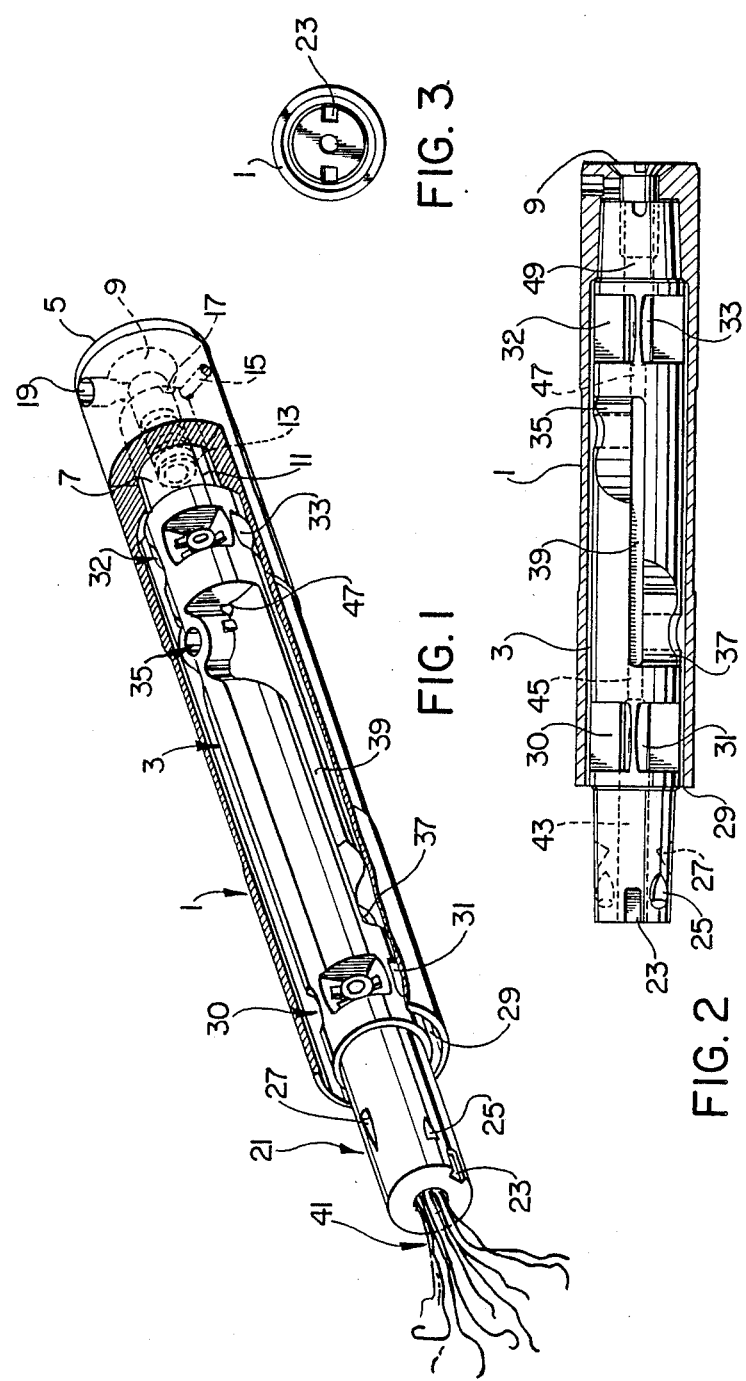

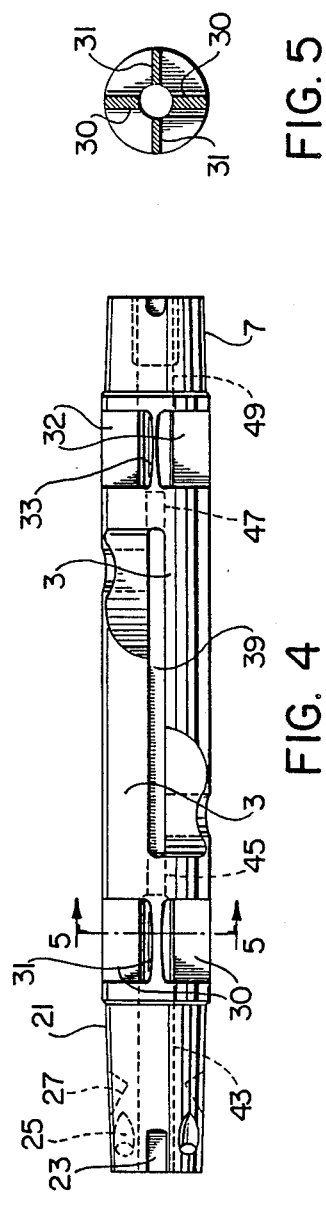
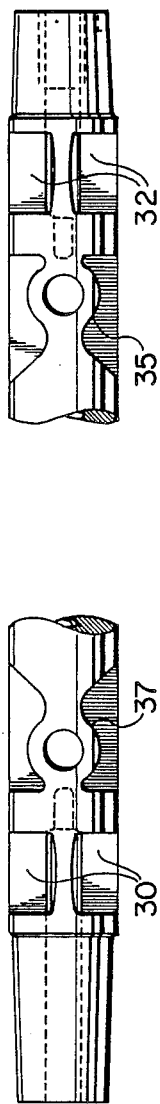
FIG. 5
FIG. 4
FIG. 7
FIG. 6

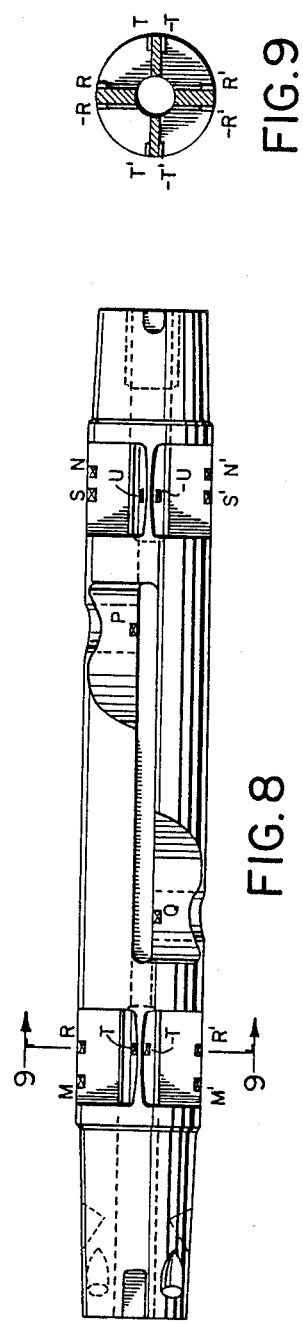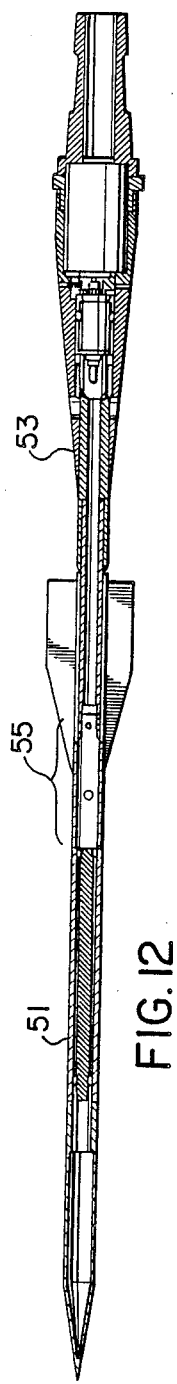

MONOPIECE STRAIN GAUGE STING MOUNTED WIND TUNNEL BALANCE

BRIEF SUMMARY OF THE INVENTION

This invention relates to a balance for an apparatus measuring the various aerodynamic coefficients of flight vehicles such as projectiles, aircraft or missiles by testing scale models of these vehicles in a wind tunnel. The various aerodynamic coefficients are derived from forces measured with sting mounted balances with six degree-of-freedom strain gauges. The wind tunnel balance will measure the following six forces and moments:
1. axial force
2. normal force
3. side force
4. pitching moment
5. yawing moment
6. rolling moment

BACKGROUND OF THE INVENTION

The six degrees of freedom are presently measured with a floating frame type of string gauge, the centre core being an assembly of several pieces. The present tie position sting balances are designed with an internal configuration which makes every attempt to eliminate interaction between the components. However, this is not completely achieved and there is interaction between the components which varies the readings obtained from 3% to 5%.

Generally the primary frames consist of an inner rod which fastens to the model support sting, and a cylindrical outer casing which is inserted into and attaches to the model. Forces and moments are resisted by individually removable elements employing flexure pivots, these being connected between the inner rod and the outer case of the balance. The six force and moment sensing components of the balance consist of two normal force elements for determination of known force and pitching moment two side force elements for determination of side force and yawing moment, a dual axial force element, and a dual role element. The normal and side force elements are equipped with relaxation members at each end and are arranged to act in roll as a set of crossed ribbon flexures. Similar relaxation members provide compliance in the axial force direction. The rolling moment elements are provided with flexure pivots at each end which are designed to transmit pure rolling moments to the gauge section. The dual axial force element is located inside the dual roll element and transmits axial force from the outer case to the inner rod.

Variations on this typical arrangement occur depending upon the balance manufacturers, however the principal characteristic of all of these balances is that no sensing component has a primary frame roll at one time.

There are limitations associated with the present sting mounted balances, the major one being their inability to handle starting and stopping loads. When balances with adequate nominal ratings designed to overcome overloads encountered during a test run, are used, the precision of the measurements deteriorates. Usually, forces and moments which are expected to be measured are slightly less than the overloads encountered at the beginning of a test run.

The internal configuration of the known sting mounted balance is intended for classical type strain gauges that measure large displacements (20000 $\mu in/in$). These strain gauges have a limited precision when compared to the new semi-conductor type strain-gauges that are 100 times more precise but are limited in displacement (5000 $\mu in/in$). This leaves room for a new internal configuration of the balance specifically intended for semiconductor type strain gauges.

The internal configuration of the known balance is also extremely complicated and made of an assembly of several pieces. These pieces are all secured in place and vibration loosening can be a problem.

The internal complexity of the known balance can also lead to extreme fragility wherein overloading can have a disastrous effect.

It is also difficult to machine such internal complexity into the known balances and there is therefore a high cost of manufacture.

The type of strain gauges which are used in the known balances are, as indicated above, the large displacement type which are influenced by temperature variations encountered during a wind tunnel test run. They, therefore, have to be fitted with thermocouples.

The strain gauges used are also of 1000 ohms or more in order to obtain acceptable sensitivity and minimize overheating. The very small thickness and cross-sectional area of the sensing components combined with the poor heat conductivity associated with a multiple piece assembly lead to the necessity to use special strain gauges. Usually, standard strain gauges of 1000 ohms or more are too large to be fitted into a sting mounted balance of 0.5 inches in diameter. The type of strain gauge used in these balances must therefore also be of special design. The repairing of strain gauges in house therefore cannot be done.

To summarize, the difficulties associated with sting mounted balances which are mandatory to test axisymmetrical type projectiles, is due to their fragility about the pitching moments, side forces and yawing moments principally. Also at the beginning of a wind tunnel test run, wind start up causes symmetrical shock waves to pass momentarily over the model and these can generate overloads on the balance. The same phenomena happens at the end of the test run. These forces are recognized as starting and stopping loads and, because of these overloads, a much stronger balance has to be used. Using a much stronger balance is to the detriment of recorded measurement precision because of the higher nominal rated capacity balance. The balance of this invention has a new configuration that can tolerate starting and stopping overloads and be 300% to 500% more precise than most of the present six degrees of freedom precision balances.

SUMMARY OF THE INVENTION

Fundamentally, the new balance of this invention is based upon a monopiece centre-core where sensing components have a roll or primary frame as well as being reference supports to the string gauges.

This dual function of the primary frame means that forces and moments, when applied to the balance, will generate interferences in several other components. The principle involved is that, because of the particular centre core configuration, it is possible to calibrate, calculate, and deduct with a very high precision, the interferences of each component over the other. Cumulative interferences on one component will vary from 0% to 15% approximately.

Except for the axial force sensing components, all forces and moments are sensed by two groups of crossed webs, one cross web at each end of the centre core. The vertical webs are preferentially thicker than the horizontal webs in order to sustain the higher normal forces and pitching moments that are expected to be encountered when compared to side forces and yawing moments.

The cross webs are preferably not of constant thickness in order to maximize displacement and particular points on them, depending upon which of the six forces and moments are in action on the bars. Strain gauges are glued at these particular points.

The axial force sensing components are made of two tensioning rings, one at each end of the centre core model structure. This offset between the upper and lower tensioning rings, which are separated vertically by a horizontal slot, is designed so that the rings are working in shear and not in tension/compression, when any one of the five forces and moments other than the axial force are applied to the balance.

The calibration procedure and the calculations to work out interferences are similar to standard type balance procedures where 3% to 5% interferences exist that have to be calibrated and calculated.

This approach to balance design of accepting interferences and interreactions between components leads to simplifications in the design. Complexity of this new design is about 80% less than classical balances of the floating-frame type wherein a maximum effort is made to minimize interferences and interreactions of each component with another.

The configuration of this invention is of the rigid-frame type. Its rigidity makes it of the low displacement type category when compared with the large-displacement floating-frame type balances. This was done intentionally to make use of newly developed semi-conductor strain gauges which are insensitive to large table variations and are up to 100 times more precise than common metallic string gauges. This leads to the possibility of increasing the balance precision and solving the problem of errors generated by temperature variations during a typical wind tunnel test.

Standard semi-conductor string gauges (of 120 ohms approximately) can be used. The monopiece internal configuration combined with large thickness and cross sectional area of sensing components results in a very good heat conductivity and dispersion.

The resulting balance is more precise than any known balance of its size and can resist starting and stopping overloads which occur at the beginning an the end of a test. In fact, it could very well be used as an overload balance.

The overall precision is about 1%, which is due mainly to the very high consistency of the semiconductor string gauges that are preferably used, and to the very low hysteresis of the very internal configuration. The configuration is also of the type which is open to the atmosphere and its open end and internal design configuration allow model base pressure at the back of the model, to act on the entire balance cross-sectional area. Therefore, if the base pressure is carefully measured, it could be replaced, when doing data reduction, by another theoretically calculated base pressure where the sting effect on the model base flow is absent. This equates with the flight of a real item being tested as a model, as, of course, the real item does not have a sting support.

BRIEF DESCRIPTION OF THE DRAWINGS

A preferred embodiment of the invention will now be described with reference to the attached drawings in which:

FIG. 1 is an isometric view of an embodiment of a balance of this invention showing the inside construction;

FIG. 2 is a partly cross-section front elevational view of the balance of FIG. 1;

FIG. 3 is a side elevational view of the balance of FIG. 2 prior to sectioning;

FIG. 4 is a front elevational view of the centre core of the balance of FIG. 2;

FIG. 5 is a side sectional elevational view on the line 5—5 of FIG. 4;

FIG. 6 is a bottom view of the left hand end of FIG. 4;

FIG. 7 is a top view of the right hand end of FIG. 4;

FIGS. 8, 9, 10 and 11 are the same type of Figure as FIGS. 4, 5, 6 and 7 except for the insertions of strain gauges;

FIG. 12 is a partly cross-sectional view of a model of a flechette mounted upon a motorized sting support and showing the position of the balance of this invention.

DETAILED DESCRIPTION OF AN EMBODIMENT OF THE INVENTION

Referring specifically to FIGS. 1 through 7, the balance consists of an outer shell 1 and a centre core 3. The centre core 3 is rigid and is itself used as a sensing component. The strain gauge reference supports are located on and integral with the rigid centre core. This type of balance is basically of the rigid frame type.

The centre core 3 is preferably made of a double vacuum melted high tensile is maraging alloy steel, or Ni-Cr-Mb high tensile alloy steel or another convenient alloy, and the outer shell 1 is preferably made from a stainless steel. The outer shell 1 is generally cylindrical with a thickened wall at one end 5 into which is machined a frustoconical shaped bore 7 and a countersunk recess 9. The centre core 3 has a machined frustoconical end 11 and a threaded axial bore so that the centre core 3 can be securely attached by one end inside the outer shell 1 by a bolt such as counter sunk headed bolt 13. A pressure fitted pin 15 which cooperates with groove 17 in centre core 3 is used to ensure that the centre core 3 does not rotate relative to the outer shell 1. In practice it is preferable to utilize two pins 15 arranged 180° to each other. The outer shell is inserted into and attached to the model, the model being located to the shell by utilizing the locating aperture 19. Other various means of locating the model upon the outer casing 1 can be utilized.

At the other end of the centre core 3 there is formed a sting holding frustoconical end 21 for securing the balance to the wind tunnel sting. The normal attachment means is utilized which consists of indexing grooves 23 which engage locating pins (not shown) inside the sting to precisely position the balance; holding notches 25 which accommodate screws (not shown) extending from the sting; and extracting notches 27 which can be engaged by other screws (not shown) and extending from the sting when the balance has to be removed from the sting.

The gap 29 between the outer shell 1 and the centre core 3 is calculated so that the outer shell 1 will not touch the centre core 3 until the maximum balance rated capacity has been attained. The eventual contact of the outer shell with the centre core will help to prevent damage being caused to the balance during extreme overload conditions.

In the centre core 3, except for the axial force sensing components, all force and moments are sensed by two groups of cross webs, one cross web at each end of the balance centre core. The cross web at the aft end of the centre core 3 consists of the aft normal force elements (upper and lower) 30 and the aft side force elements (right and left) 31. The cross webs at the fore end of the centre core 3 consist of the front normal force elements (upper and lower) 32 and the front side force elements (right and left) 33.

The working principle is the same for normal force and pitching moment sensing elements as for side force yawing moment elements. A normal force and pitching moment elements 30 and 32 are stronger than the side force and yawing moment elements 31 and 33 so that the higher level normal force and pitching moments are sensed by the stronger webs while the lower lever side forces and yawing moments are sensed by the weaker webs. The cross webs are not of a constant thickness along their length, but have a longitudinal cross-section which forms a double taper wherein the point of minimum thickness is located about one third along their length. Referring specifically to FIGS. 8, 9, 10 and 11 the location of the strain gauge bridges R, S, T, and U are situated as shown. The double taper of the webs and the positioning of the strain gauge bridges maximizes the displacement of the strain gauge bridges R, S when a normal force and/or a pitching moment is applied to the balance; and also the same procedure applies to strain gauge bridges T and U when a side force and/or yawing moments are applied to the balance. The strain gauge bridges R, S, T, and U are glued or otherwise suitably attached to the point of minimum thickness of each web.

A simple set of equations from standard static physics are used to separate normal force and pitching moment. For example, a pure pitching moment produces identical signals from bridges R and S. A pure normal force produces a difference of signals from bridges R and S. The absolute difference is proportional to the normal force. The absent difference of signals from bridges R and S combined with their respective values can provide a normal force and centre of pressure. It is then possible to derive a pitching moment with respect to a specified moment resolving centre (MRC), depending upon each test requirement. The normal force calculated remains the same whatever the MRC chosen. Usually, the MRC position corresponds to the position of the centre of gravity of the real vehicle in flight configuration.

The axial force sensing components consist of two tensioning rings or a front axial force element 35 and an aft axial force element 37. An axial transverse slot 39 extends between the outermost ends of the tensioning rings and the distance between the front axial force element and the aft axial force element is designed so that they are working in shear and not in tension/compression when anyone of the five forces/moments (other than the axial force) are applied to the balance.

If the front axial force element had been aligned with the aft axial force element, the balance rigidity in side force and yawing moment would have been very weak. The longitudinal offset between the axial force elements 35 and 37 elements helps to minimize interference on the axial force component when a normal force of pitching moment is applied to the balance as well as to augment its rigidity in pitch.

Referring specifically to FIGS. 8 and 10, the rolling moment is sensed by two string gauge bridges M and N which are glued or otherwise suitably secured on the thin section of the webs 30 and 32. When torsion (rolling moment) is applied to the balance, bending at the thin section of the cross webs induces displacements on their surfaces, precisely where the rolling moment strain gauges are located.

A summary of the strain gauge arrangement shown in FIGS. 8, 9, 10 and 11 is as follows:

Normal force and pitching moment: 2 bridges "R" and "S" on the thick vertical webs, on their thin section.

Side force and yawing moment: 2 bridges "T" and "U" on the thin section horizontal webs.

Axial force: 2 bridges "P" and "Q" on the tensioning rings close to the balance centre-core 3 axis Rolling moment: 2 bridges "M" and "N" at each end of the centre-core 3 on thick section vertical webs

TABLE 1

| BRIDGE/STRAIN ARRANGEMENT (Note 1) | DESCRIPTION | OUTPUT EQUATION-$E_o/E$ IN mV/V (Notes 2, 3) | ACTUAL STRAIN $\frac{\text{INDICATED STRAIN}}{} = \frac{\epsilon}{\epsilon}$ | COMMENTS |
|---|---|---|---|---|
| B 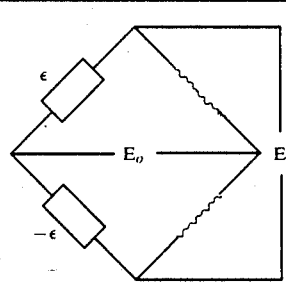 | Two active gages with equal & opposite strains-typical of bending beam arrangement. | $\frac{E_o}{E} = \frac{F\epsilon}{2} \times 10^{-3}$ | $\frac{\epsilon}{\epsilon} = 1$ | Linear. |

TABLE 1-continued

| BRIDGE/STRAIN ARRANGEMENT (Note 1) | DESCRIPTION | OUTPUT EQUATION-$E_o/E$ IN mV/V (Notes 2, 3) | ACTUAL STRAIN / INDICATED STRAIN = $\epsilon/\varepsilon$ | COMMENTS |
|---|---|---|---|---|
| A 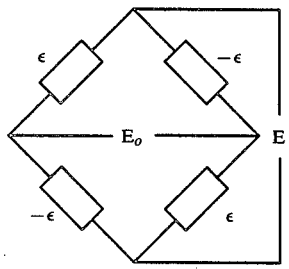 | Four active gages with pairs subjected to equal and opposite strains (beam in bending or shaft in torsion). | $\dfrac{E_o}{E} = F\epsilon \times 10^{-3}$ | $\dfrac{\epsilon}{\varepsilon} = 1$ | Linear. |

NOTES:

1  $(R_1/R_4)_{nom} = 1$; $(R_2/R_3)_{nom} = 1$ when two or less active arms are used.

2 Constant voltage power supply is assumed.

3 $\epsilon$ and $\varepsilon$ (strains) are expressed in microstrain units (in/in × $10^4$).

The bridge M is made of M, −M, M' and −M' straining gauges. The same principle applies to the other bridges. They are connected as indicated in option A of table 1.

Should it be necessary to have more data on the various interactions of each component, the number of bridges can be doubled. Strain gauges would then be connected as indicated at option B in table 1. The M bridge would be divided into M and M', the bridge M would comprise strain gauges M and −M plus two resistors. M'bridge would be made of M' and −M' plus two resistors. The same principle would be applied to all bridges if necessary depending upon the particular balance built for specific needs.

The wiring 41 to and from the strain gauges is accommodated within the balance through clearance apertures 43, 45, 47, and 49.

Referring specifically to FIG. 12, there is shown a flechette 51 mounted upon a wind tunnel sting 53, the balance of this invention being situated between the sting and the flechette at the position shown by the reference numeral 55. The sting 53 is of the standard rotational type.

It will thus be seen that a new type of balance has been disclosed which has the following advantages over all known types.

1. The new balance configuration offers the possibility to combine high precision of measurement and ruggedness.

2. Overload forces that can be overcome by this new balance are larger than known typical overload sustaining balances. Usually an overload balance will sustain overloads of up to 150% of the nominal capacity of the corresponding precision type balance*. The new proposed balance configuration allows overloads of up to 200% that of the maximum loads (nominal capacity) sustainable by the corresponding precision type balances*.

*Note: "corresponding precision type balance" is defined as the balance with a nominal capacity approximately equal to 125% to 150% of the expected forces and moments which are to be measured. There is a direct relationship between the size of a balance and the size of the models to be fitted on it. Thus, the size of a balance determines rather its nominal capacity. Therefore, there are classes of balances intended to be used only in an indraft wind tunnel or in a blow-down wind tunnel. Since the dynamic pressure is about 30 times higher in a blow-down wind tunnel than in an indraft wind tunnel, the nominal capacity of each class of balance differs greatly. All of this discussion refers to a class of balance intended for use in an indraft wind tunnel i.e. high precision in a field of low nominal capacity. For example, a high precision balance used in a blow-down wind tunnel would be identified as a high overload balance when used in an indraft wind tunnel. (Of course, this proposal can be applied to a balance intended to be used in a blow-down wind tunnel).

3. Precision is greatly increased with this new balance. It is approximately 300% to 500% more precise than known typical precision type balances.

4. The following table of comparison between expected performances of the new balance configuration and a typical precision type 0.50 in balance which is one of the most precise in the world.

| | NEW BALANCE 0.500 in. diameter | | | ABLE MK VI A BALANCE 0.500 in diameter | |
|---|---|---|---|---|---|
| | Very High Precision Nominal Capacity | High Precision Nominal Capacity | Max. Overload Capacity | High Precision Nominal Capacity | Max. Overload Capacity |
| | | | (Measurement possible) | | (Measurement possible) |
| Normal Force (lb) | 15 | 60 | 125 | 25 | 50 |
| Side Force (lb) | 10 | 30 | 60 | 15 | 30 |
| Axial Force (lb) | 10 | 25 | 40 | 15 | 30 |
| Rolling Moment (lb-in) | 5 | 7 | 15 | 7 | 15 |
| Pitching Moment | 15 | 50 | 100 | 26 | 52.5 |

|  | NEW BALANCE 0.500 in. diameter | | | ABLE MK VI A BALANCE 0.500 in diameter | |
| --- | --- | --- | --- | --- | --- |
|  | Very High Precision Nominal Capacity | High Precision Nominal Capacity | Max. Overload Capacity | High Precision Nominal Capacity | Max. Overload Capacity |
| (lb-in) Yawing Moment | 8 | 25 | 50 | 13 | 25.5 |
| (lb-in) Low Force Reliability Limit (lb) | 0.50 | | | | 2.5 |

5. The simplicity of this new 6 DOF balance configuration is remarkable when compared to present 6 DOF precision type balances. It may be possible to locate simpler balance configurations than the balance disclosed in this application, however these balances offer less DOF (degree of freedom), such as 5 DOF or 4 DOF. This means that one or more of the side force components usually measured during a wind tunnel test run will be absent.

6. Another specific feature of the proposed balance is its rigidity. Usually typical strain gauges balances are based upon a configuration that will provide large displacements because they use large displace type strain gauges (20000 μin/in). The proposed balance gives small displacements (up to 5000 μin/in) and offers the advantage of limiting non-linearity of strain-gauges caused by large displacements. Induced errors generated on the angle of attack and yaw angle measurements will be less significant because the balance has less displacement when a force is applied to it.

7. This rigid small displacement type balance configuration as disclosed, combined with very good heat conductivity associated with its monopiece construction and internal design, is specially well suited for new and small displacement type semi-conductor strain-gauges. The possibility to use these strain gauges is very interesting because they are 100 times more precise than metallic types and insensitive to temperature variations.

8. Simplicity of the configuration leads to less expensive machining and an overall cost reduction of about 60%.

9. The centre-core is monopiece which is unlike known 6 DOF balances where the centre-core is an assembly of several pieces fastened together with assembly screws. Mechanical problems are therefore absent with a monopiece centre-core construction.

10. One of the most important features of this new balance is that interferences of one component on the other are tolerated and calibrated. Because of the large number of component typical to a high precision type strain gauge balance assembly, it is almost impossible to eliminate interference between the components. Residual interferences have to be tolerated and vary from 3% to 5% and have to be calibrated. The new proposed balance configuration has a maximum interference of about 15% to 20% that will also have to be calibrated like the present known type of balances. It is submitted that the extreme complexity type of high precision balances is not justified since these internal interferences have to be calibrated in the same manner as a balance with large interferences. The acceptance of this fact leads to a completely different approach to the problem and therefore a new type of balance disclosed herein.

11. The average base pressure (the air pressure at the aft end of the model) is acting on the entire cross-sectional area of the model including the area intersected by the sting/balance. There are two conditions that make this possible which are firstly, the balance is opened to the atmosphere at the aft end, and secondly, the internal configuration allows the base pressure to act upon the entire balance cross-sectional area.

The cross-section configuration of the normal-force and side-force elements, combined with the transverse slot and the holes in the axial force elements allow the base pressure to act upon the entire internal balance configuration. Since the sting does not touch the balance outer shell, there is no induced error, the air gap between the sting front end and the balance outer shell allowing the base pressure to act on the edge of the outer shell. Therefore, the base pressure acts upon the entire balance cross-sectional area.

This feature presents an advantage in data reduction related to sting interference problems. With the known classical sealed balance, there are uncertainties on the real area upon which the base pressure acts. This is dependent upon the degree of tight fit between the balance housing in the model and the balance. There are already balances open to the atmosphere but this feature generally belongs to the overload balances. High precision balances are usually sealed because of their internal configuration fragility. With time, a pressure equilibrium is established because of air leaks. But, during a wind tunnel run (5-10 seconds) it is unclear as to really what happens to the air pressure inside the balance. This is problematic with a sealed balance.

It is thus seen that a new rugged high precision balance has been disclosed which possesses many advantages over known balances.

We claim:

1. A strain gauge balance consisting of an outer longitudinal shell and a monopiece inner centre core; the outer shell having a open end and a closed end with a frustoconical bore extending towards the closed end, and the inner core having frusto conical shaped ends, one end being sized to fit within the frusto conical bore and the other end being sized to fit into a sting; four radially extending, equally spaced, webs formed within the core and at each end of the core inboard of the frusto conical ends, and a central region of two longitudinally separated, semicircular cross-section parts each being formed within the part, with tensioning rings, one disposed diagonally to the other, and a number of strain gauges secured to the webs and the rings to determine induced strain in 6 degrees of freedom.

2. The strain gauge balance of claim 1, wherein the outer shell is of generally cylindrical shape.

3. The strain gauge balance of claim 1, wherein the closed end of the outer shell has an aperture therethrough such that a bolt can pass through the aperture and be accommodated in a threaded bore within the adjacent end of the inner centre core.

4. The strain gauge balance of claim 1, wherein the inner wall of the outer shell is of slightly longer diameter than the outer diameter of the inner centre core such that, during normal operation, the core does not contact the shell except at one end, however during overloading excessive bending of the inner centre core is prevented by contact with the outer shell.

5. The strain gauge balance of claim 1, wherein the webs are each thicker at their radial edges and their axially oriented edges and taper to their thinnest along their central radial region at a position approximately one third along their length.

6. The strain gauge balance of claim 5, wherein the webs are oriented vertically and horizontally and the vertically oriented webs are thicker than the horizontally oriented webs.

7. The strain gauge balance of claim 1, wherein a strain gauge is secured to each web and to each transverse position on each tensioning ring and an aperture is provided along the axis of the inner centre core so that the electrical wires to and from the strain gauges can be lead through the core and into the string.

8. A strain gauge balance consisting of an outer longitudinal shell and an inner centre core; the outer shell being generally cylindrical with an open end and a closed end with a frusto conical bore extending towards the closed end, and the inner core having frusto conical shaped ends, one end being sized to fit within the frusto conical bore and the other end being sized to fit into a sting, the closed end of the outer shell having an aperture therethrough such that a bolt can pass through the aperture and be accommodated in a threaded bore within the adjacent end of the inner centre core; four radially extending, equally spaced, webs formed within the core and at each end of the core inboard of the frusto conical ends, each web being thicker at its radial edges and its axially oriented edges and tapering to its thinnest at its central radial region at a position approximately onethird along its length, the webs being oriented vertically and horizontally with the vertically oriented webs being thicker than the horizontally oriented webs, a central region of two longitudinal separated, semicircular cross section parts each being formed within the part, with tensioning rings, one disposed diagonally to the other, and a number of strain gauges secured to the webs and the rings to determine induced strain in 6 degrees of freedom, there being a strain gauge secured to each web and to each transverse position on each ring, and an aperture along the axis of the inner centre core so that electrical wires to and from the strain gauges ca be lead through the core and into the sting.

* * * * *